(12) United States Patent
Parenti

(10) Patent No.: US 6,892,483 B2
(45) Date of Patent: May 17, 2005

(54) REVERSIBLE LOCKING LICENSE PLATE AND REGISTRATION STICKER TAG PROTECTION FRAME

(76) Inventor: Steve Parenti, 36425 Newark Blvd., Newark, CA (US) 94560

( * ) Notice: Subject to any disclaimer, the term of this patent is extended or adjusted under 35 U.S.C. 154(b) by 14 days.

(21) Appl. No.: 10/282,078

(22) Filed: Oct. 28, 2002

(65) Prior Publication Data

US 2004/0079008 A1 Apr. 29, 2004

(51) Int. Cl.$^7$ .............................................. G09F 7/00
(52) U.S. Cl. .............................. 40/201; 70/230; 70/232
(58) Field of Search .................. 70/230, 232, DIG. 57; 40/201, 202, 203

(56) References Cited

U.S. PATENT DOCUMENTS

| | | | | |
|---|---|---|---|---|
| 2,776,507 A | * | 1/1957 | Stombock | 40/202 |
| 3,685,188 A | * | 8/1972 | Syversen | 40/201 |
| 4,030,324 A | * | 6/1977 | Rizio | 70/232 |
| 4,144,729 A | | 3/1979 | Nielsen, Jr. | 70/63 |
| 4,182,062 A | | 1/1980 | Krokos et al. | 40/209 |
| 4,223,542 A | | 9/1980 | Basseches | 70/58 |
| 4,314,417 A | | 2/1982 | Cain | 40/209 |
| 4,506,528 A | | 3/1985 | Eberly | 70/18 |
| 4,655,060 A | | 4/1987 | Jakubas | 70/230 |
| 4,788,840 A | | 12/1988 | Wilson | 70/164 |
| D308,849 S | | 6/1990 | Short | D12/193 |
| 5,012,602 A | | 5/1991 | Storey | 40/201 |
| 5,027,537 A | | 7/1991 | Freeman | 40/210 |
| 5,199,286 A | | 4/1993 | Jakubas | 70/230 |
| 5,299,721 A | | 4/1994 | Cummings | 224/42.42 |
| 5,381,618 A | | 1/1995 | Singleton | 40/202 |
| 5,392,619 A | | 2/1995 | Dunaway | 70/57 |
| 5,404,664 A | | 4/1995 | Brooks | 40/202 |
| 5,487,288 A | | 1/1996 | Frantz | 70/259 |
| 5,488,790 A | | 2/1996 | Blauer | 40/209 |
| 5,623,776 A | | 4/1997 | Lucier | 40/209 |
| 5,659,986 A | | 8/1997 | Simmons | 40/202 |
| 5,839,303 A | | 11/1998 | Umberg et al. | 70/58 |
| 5,896,685 A | | 4/1999 | McCall | 40/202 |
| 6,158,154 A | | 12/2000 | Parenti | 40/200 |
| 6,286,238 B1 | | 9/2001 | Harrington | 40/202 |
| 6,305,107 B1 | | 10/2001 | Parenti | 40/201 |
| 6,385,876 B1 | | 5/2002 | McKenzie | 40/201 |

* cited by examiner

Primary Examiner—Mark T. Le
(74) Attorney, Agent, or Firm—John P. Wooldridge

(57) ABSTRACT

A reversible license plate frame is provided that will prevent theft of a license plate and the registration sticker. The reversible locking license plate and registration sticker tag protection frame of the present invention includes a license plate frame comprising a heavy material frame that surrounds unbreakable windows that protect the registration tags regardless of which of the four corners of the license plate to which the tag may be affixed. This prevents the removal of the registration tags by unauthorized persons. To prevent theft, a locking bar configured to receive a cylinder lock covers the screws that attach the frame to the license plate mount. The cylinder locks cannot be removed without a key rendering the screws inaccessible.

20 Claims, 9 Drawing Sheets

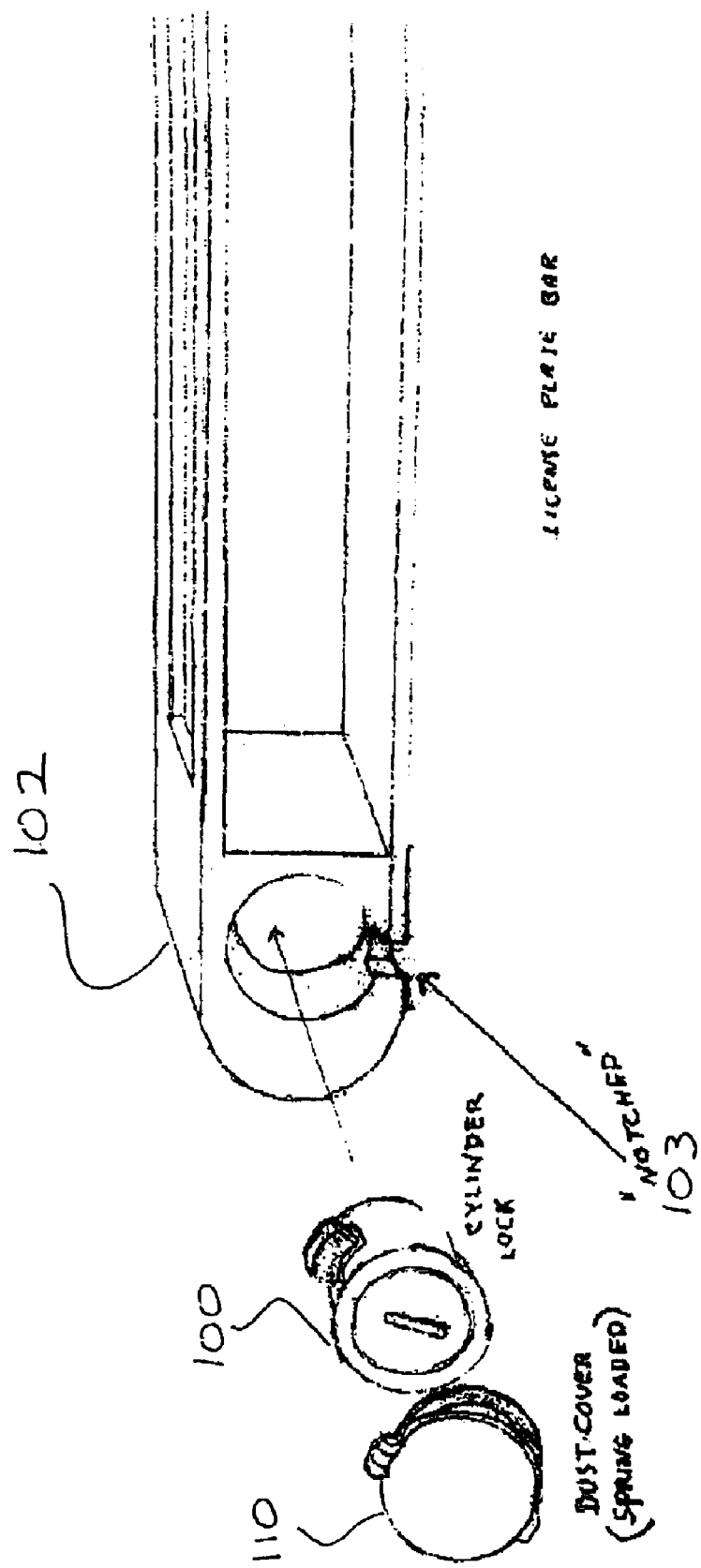

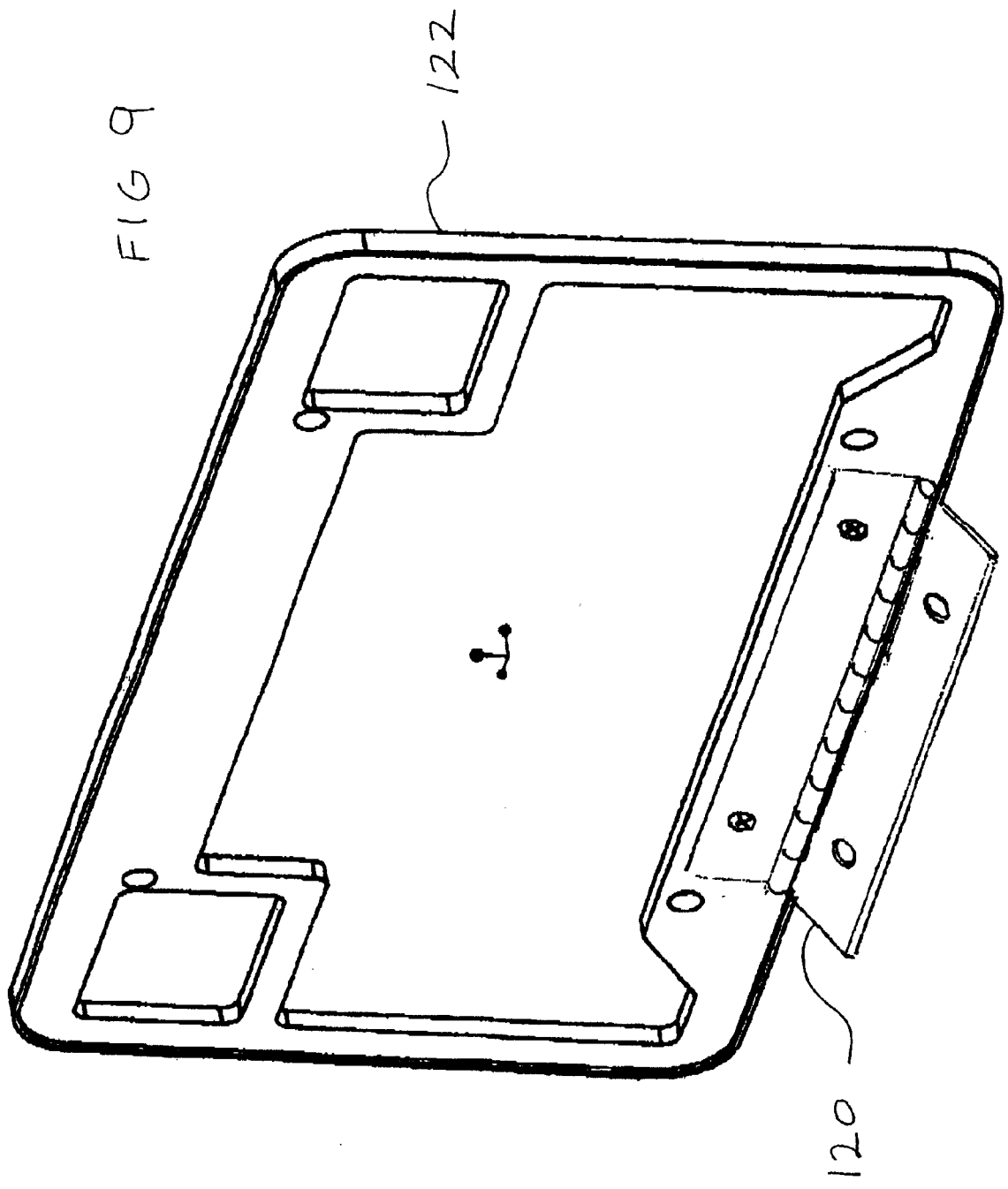

REVERSIBLE LOCKING LICENSE PLATE AND REGISTRATION STICKER TAG PROTECTION FRAME

BACKGROUND OF THE INVENTION

1. Field of the Invention

The present invention relates to license plate protection means and more specifically, to a license plate frame having a locking means for preventing removal of either the license plate or the renewal sticker which may be affixed to the license plate.

2. Description of Related Art

The use of vehicle license plate mounts and registration sticker protectors are known in the prior art. Such vehicle license plate mounts and registration sticker protectors consist of structural configurations that are familiar, expected and obvious.

Known prior art includes U.S. Pat. Nos. 4,144,729, 4,223,542, 5,839,303, 4,506,528, 4,655,060, 4,788,840, 5,199,286, 5,299,721, 5,487,288, 5,659,986, 5,012,602, 5,404,664, 5,392,619, 5,027,537, 4,182,062, 5,623,776, 5,381,618, 5,488,790, 4,314,417, 5,896,685, 6,385,876, 6,286,238 and U.S. Pat. No. Des. 308,849.

In these respects, the reversible locking license plate and registration sticker tag protection frame assembly of the present invention substantially departs from the conventional concepts and designs of the prior art, and in so doing provides an apparatus primarily developed for the purpose of preventing theft of a vehicular license plate and the registration sticker.

SUMMARY OF THE INVENTION

It is an object of the present invention to provide a license plate frame that will prevent theft of a license plate.

It is another object of the invention to provide a license plate frame that will prevent theft of a license plate registration sticker.

These and other objects will be apparent based on the disclosure herein.

The reversible locking license plate and registration sticker tag protection frame of the present invention includes a license plate frame comprising a heavy material frame that surrounds unbreakable windows that protect the registration tags regardless of which of the four corners of the license plate to which the tag may be affixed. This prevents the removal of the registration tags by unauthorized persons.

A portion of the license plate frame may be designed to bear an engraved message, and can be wired into the vehicle tail tight or stop light system so that the message will light up when the vehicle lights are turned on. Other embodiments provide places for sticker decals, such as auto dealerships or sports logos.

In a basic embodiment of the invention, a reversible license plate frame has two windows that are each covered with translucent material. An open portion is provided. Through holes are provided through four places in the frame. To attach the frame to an automobile license plate mounting port, a back bar with two threaded holes is placed behind the automobile license plate mounting port. The license plate frame is placed on the front side of the automobile license plate mounting port so that through holes align with threaded holes. A pair of screws pass through holes in the frame, through the mounting port and into the threaded holes of the back bar to secure the frame to the automobile such that one of the windows will cover the registration sticker.

To prevent theft, a locking bar is provided that covers the through holes of the frame. The locking bar is configured to receive a cylinder lock. A laterally drilled hole is provided in each of the bored out portions to allow passage of the lock pin of each cylinder lock. A cover plate may be used to cover the unused through holes of the frame. This entire structure may be reversed top to bottom for jurisdictions that provide for registration stickers on the bottom of the license plate.

The cylinder lock includes a lock pin and the bored out holes each have a through hole adapted to pass the lock pin. When the key for a cylinder lock is turned, the lock pin is passed through the laterally drilled hole of the locking bar and into the lock pin entrance. When the key is disengaged, the lock pin is retained in the cylinder lock. Thus, each cylinder lock cannot be removed without its key and the screw behind the respective lock is inaccessible, preventing removal of the license plate frame and the registration sticker. The invention provides for enhancements to the license plate frame and the locking bar such as lighting and engraving.

BRIEF DESCRIPTION OF THE DRAWINGS

FIG. 8 shows a spring loaded dust cover for placement over the top of the cylinder lock.

FIG. 9 shows a hinge attached to the edge of the license plate frame for attachment to the vehicle to facilitate installation of the registration tags.

DETAILED DESCRIPTION OF THE PREFERRED EMBODIMENTS

The invention is a reversible locking license plate and registration sticker tag protection frame. It can be made from a wide variety of materials, e.g., aluminum, plastic, metal or moldable materials. In one embodiment, the license plate frame comprises a heavy material frame that surrounds a translucent window made of, e.g., glass, plastic or polycarbonate such as Lexan®. The windows are configured to protect the registration tags regardless of which of the four corners of the license plate to which the tag may be affixed. This prevents the removal of the registration tags by unauthorized persons.

Lexan®, which is a polycarbonate, has an extremely high impact resistance and is transparent. Polycarbonates have 250 times the impact strength of glass and 30 times the impact of acrylic. Maintenance such as cleaning and scratch removal is lower also. Lexan® is manufactured by the General Electric Company. GE also holds numerous patents directed to polycarbonates. Lexan® is designed to be the most UV/abrasion-resistant polycarbonate on the market, and is considered virtually unbreakable.

As an esthetic enhancement to the present invention, a portion of the license plate frame may be designed so that a message may be engraved thereon, and can be wired into the vehicle tail light or stop light system so that the message will light up when the vehicle lights are turned on. Other embodiments provide places for sticker decals, such as auto dealerships or sports logos.

Figure 1:
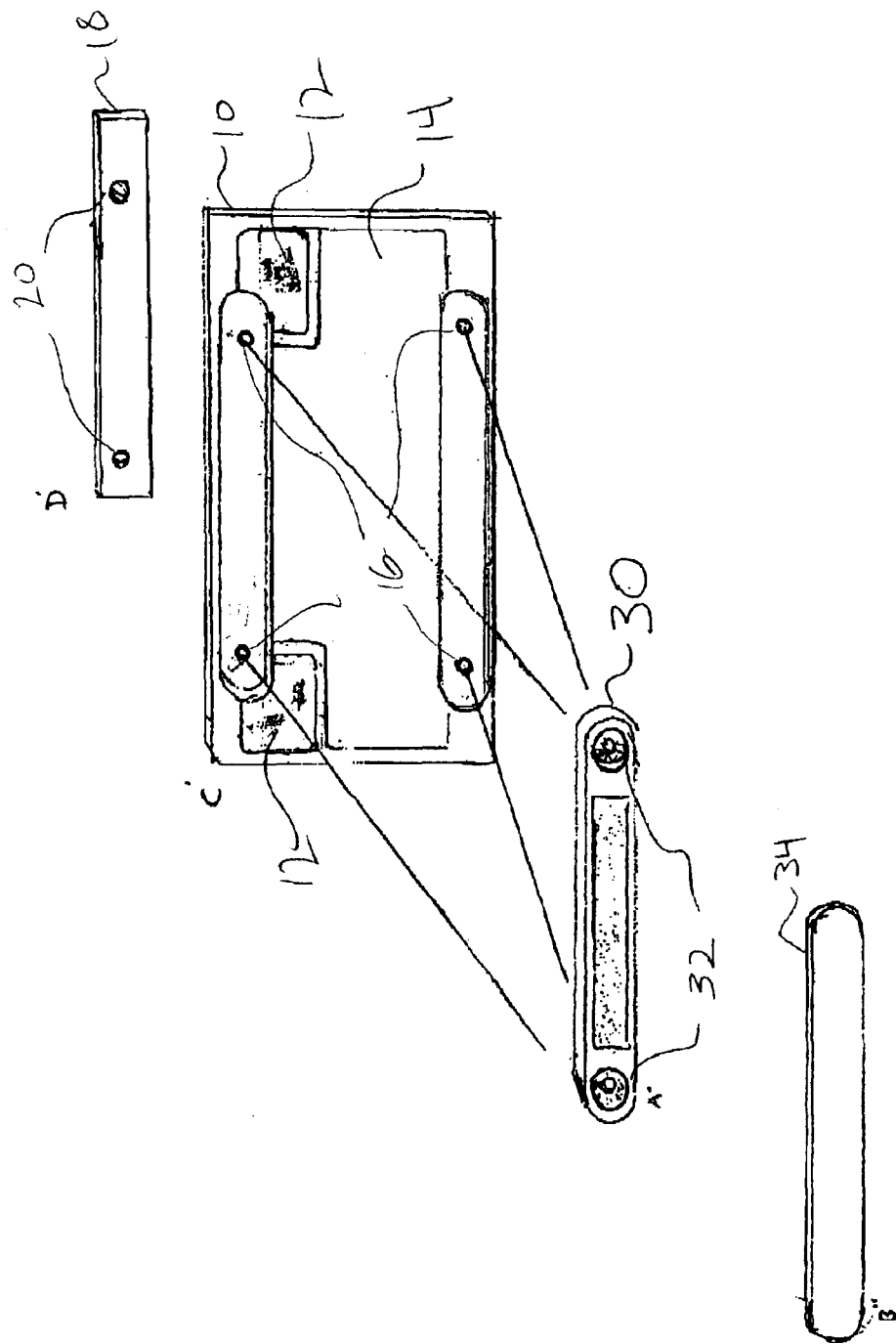
FIG. 1 shows a basic embodiment of the invention.

FIG. 1 shows a basic embodiment of the invention. Reversible license plate frame 10 has two windows 12 that are each covered with translucent material such as glass, plastic, polycarbonate (Lexan®), etc. An open portion 14 is provided. Through holes 16 are provided through four places in the frame 10. To attach the frame to an automobile license plate mounting port (not shown) or other attachment mechanism, back bar 18, having two threaded holes 20, is placed behind the automobile license plate mounting port. The license plate frame 10 is placed on the front side of the automobile license plate mounting port so that through holes 16 align with threaded holes 20. A screw passed through the through hole 16, through the automobile license plate mounting port hole and into the threaded hole 20, once tightened, will secure the frame to the automobile. In this position, one of the windows 12 will cover the registration sticker, but the frame will not prevent theft in this configuration because the screw that secures the frame to the automobile are easily accessible.

To prevent theft, a locking bar that covers the through holes 16 is provided. The locking bar 30 has two bored out portions 32 configured to each receive a cylinder lock (not shown). A laterally drilled hole (not shown) is provided in each of the bored out portions 32 to allow passage of a locking extension comprising the lock pin of each cylinder lock. For esthetic purposes, a cover plate 34 is provided to cover the unused through holes 16. Short screws are passed from the inside of the frame through the through holes 16 and into threaded holes (not shown) provided on the inside of the cover plate 34. The locking bar 30, the cover plate 34 or suitable portions of the frame 10 may be engraved or may be used to support stickers or emblems.

Figure 2:
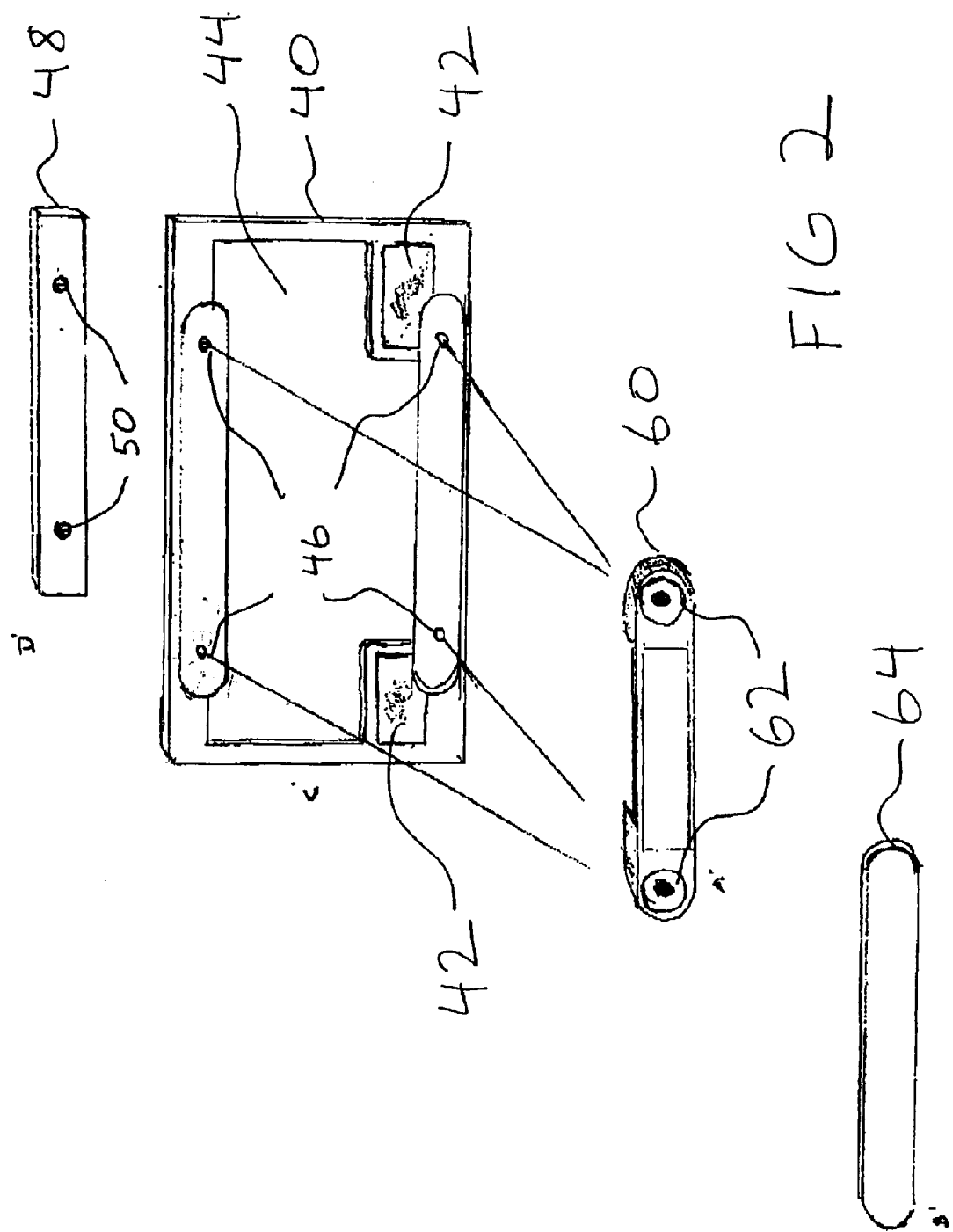
FIG. 2 illustrates the license plate of the present invention in the reversed position as compared to the position shown in FIG. 1.

FIG. 2 illustrates the license plate of the present invention in the reversed position as compared to the position shown in FIG. 1. In this figure, license plate frame 40 has two windows 42 that are each covered with translucent material such as glass, plastic, polycarbonate (Lexan®), etc. An open portion 44 is provided. Through holes 46 are provided through four places in the frame 40. To attach the frame to an automobile license plate mounting port (not shown) or other attachment mechanism, back bar 48, having two threaded holes 50, is placed behind the automobile license plate mounting port. The license plate frame 40 is placed on the front side of the automobile license plate mounting port so that through holes 46 align with threaded holes 50. A screw passed through the through hole 46, through the automobile license plate mounting port hole and into the threaded hole 50, once tightened, will secure the frame to the automobile. In this position, one of the windows 42 will cover the registration sticker, but the frame will not prevent theft in this configuration because the screw that secures the frame to the automobile are easily accessible.

To prevent theft, a locking 60 bar that covers the through holes 46 is provided. The locking bar 60 has two bored out portions 62 configured to each receive a cylinder lock (not shown). A laterally drilled hole (not shown) is provided in each of the bored out portions 62 to allow passage of a locking extension comprising the lock pin of each cylinder lock. For esthetic purposes, a cover plate 64 is provided to cover the unused through holes 46. Short screws are passed from the inside of the frame through the through holes 46 and into threaded holes (not shown) provided on the inside of the cover plate 64. The locking bar 60, the cover plate 64 or suitable portions of the frame 40 may be engraved or may be used to support stickers or emblems. It should be noted that the present invention can be used to protect other encased documents or signs, e.g., a motorcycle, bicycle or trailer license plate.

Figure 3:
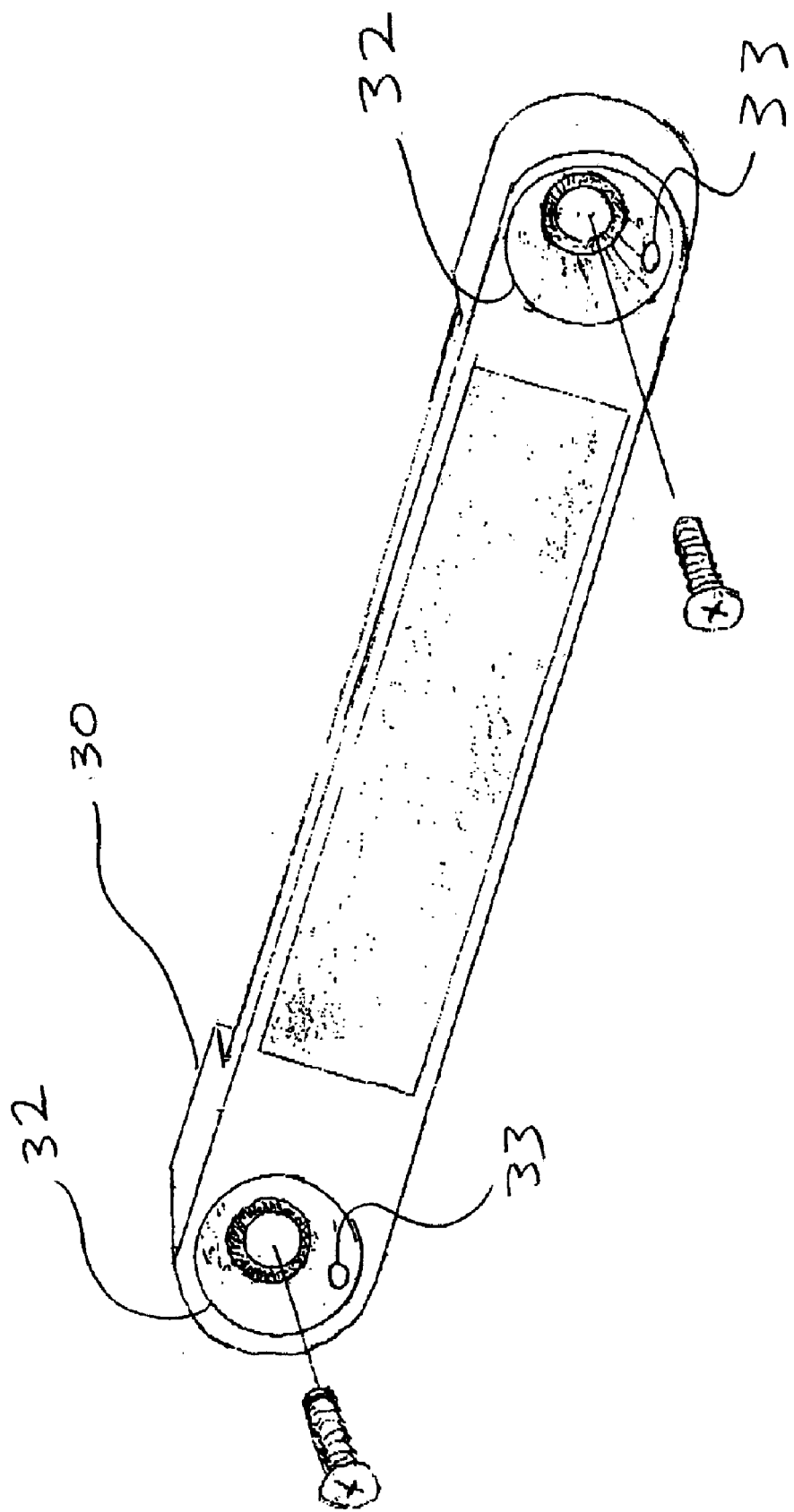
FIG. 3 shows a perspective view of the locking bar of FIG. 1.

FIG. 3 shows a perspective view of locking bar 30 of FIG. 1. The same configuration of locking bar can be used for locking bar 60 in FIG. 2. The figure shows in greater detail the two bored out portions 32 configured to each receive a cylinder lock (not shown). A laterally drilled hole 33 is provided in each of the bored out portions 32 to allow passage of a locking extension comprising the lock pin of each cylinder lock. The hole 33 can be located in positions of bored out portions 32 other than that shown.

Figure 4:
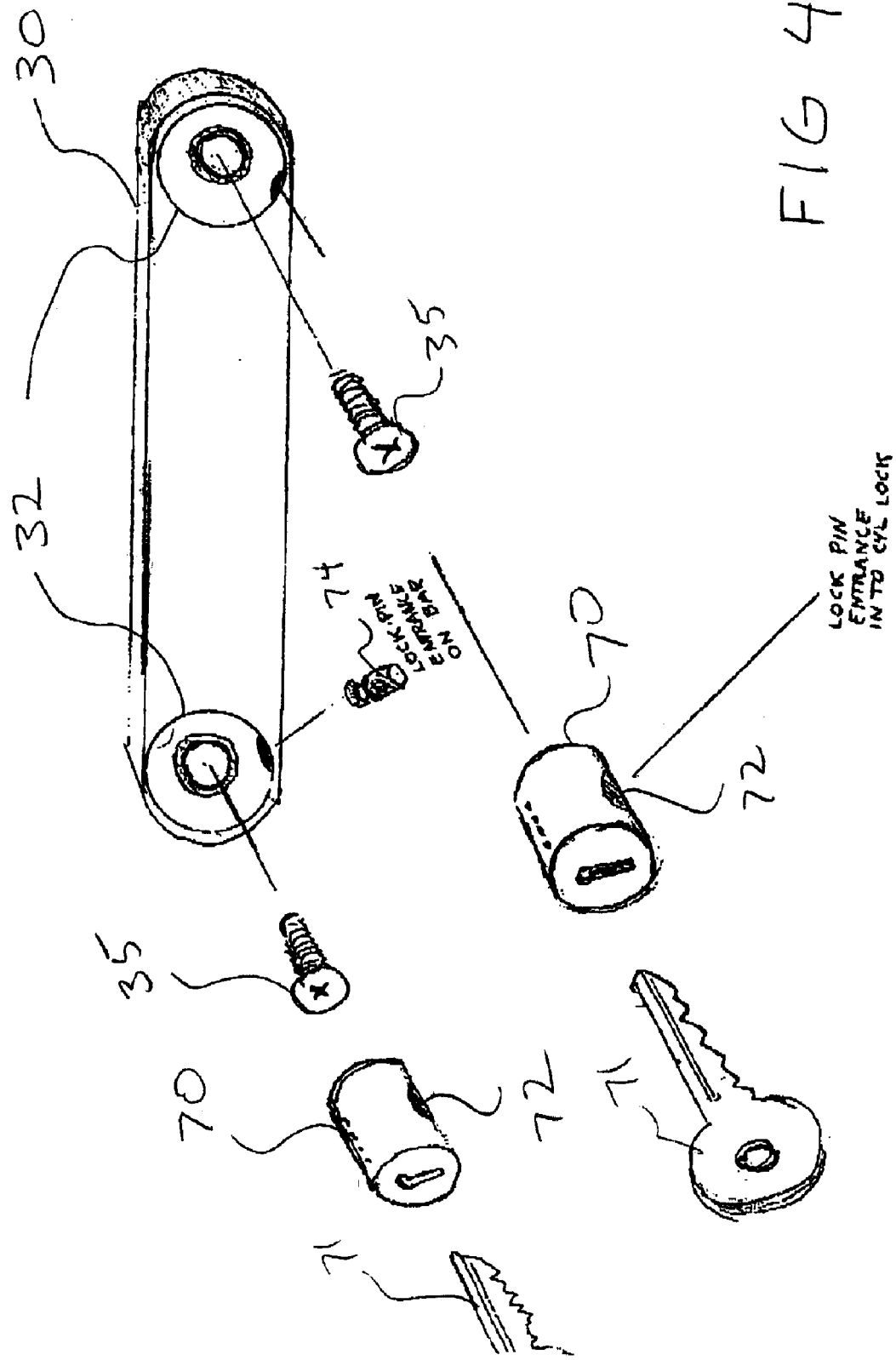
FIG. 4 illustrates the assembly and placement of the cylinder locks into the bored out portions of FIG. 1.

FIG. 4 illustrates the assembly and placement of the cylinder locks 70 into the bored out portions 32 of FIG. 1. The locking bar 30 is placed over the through holes 16 of the license plate frame 10 of FIG. 1, which is aligned to the automobile mounting license plate mount. The backing plate 18 of FIG. 1 is placed to the rear of the license plate mount. Screws 35 are then threaded into the threaded holes 20 of the backing plate 18 to secure the frame 10 and the locking bar 30 to the license plate mount. As shown in FIG. 4, a cylinder lock 70, with a lock pin entrance 72 is placed in each of the bored out holes 32 of the locking bar 30. When the keys 71 are turned, the lock pins 74 are passed through the laterally drilled holes 33 of the locking bar 30 and into the lock pin entrance 72. When the keys 71 are disengaged, the lock pins 74 are retained in the cylinder locks 70. Thus, the cylinder locks cannot be removed without the key 71 and the screws 35 are inaccessible, preventing removal of the license plate frame and the registration sticker. Cylinder locks 72 are known in the art, and may be purchased, e.g., from Pioneer Hardware Co. LTD. located in Taiwan. Other types of cylinder locks are usable in the present invention. See, e.g., FIG. 7.

Figure 5:
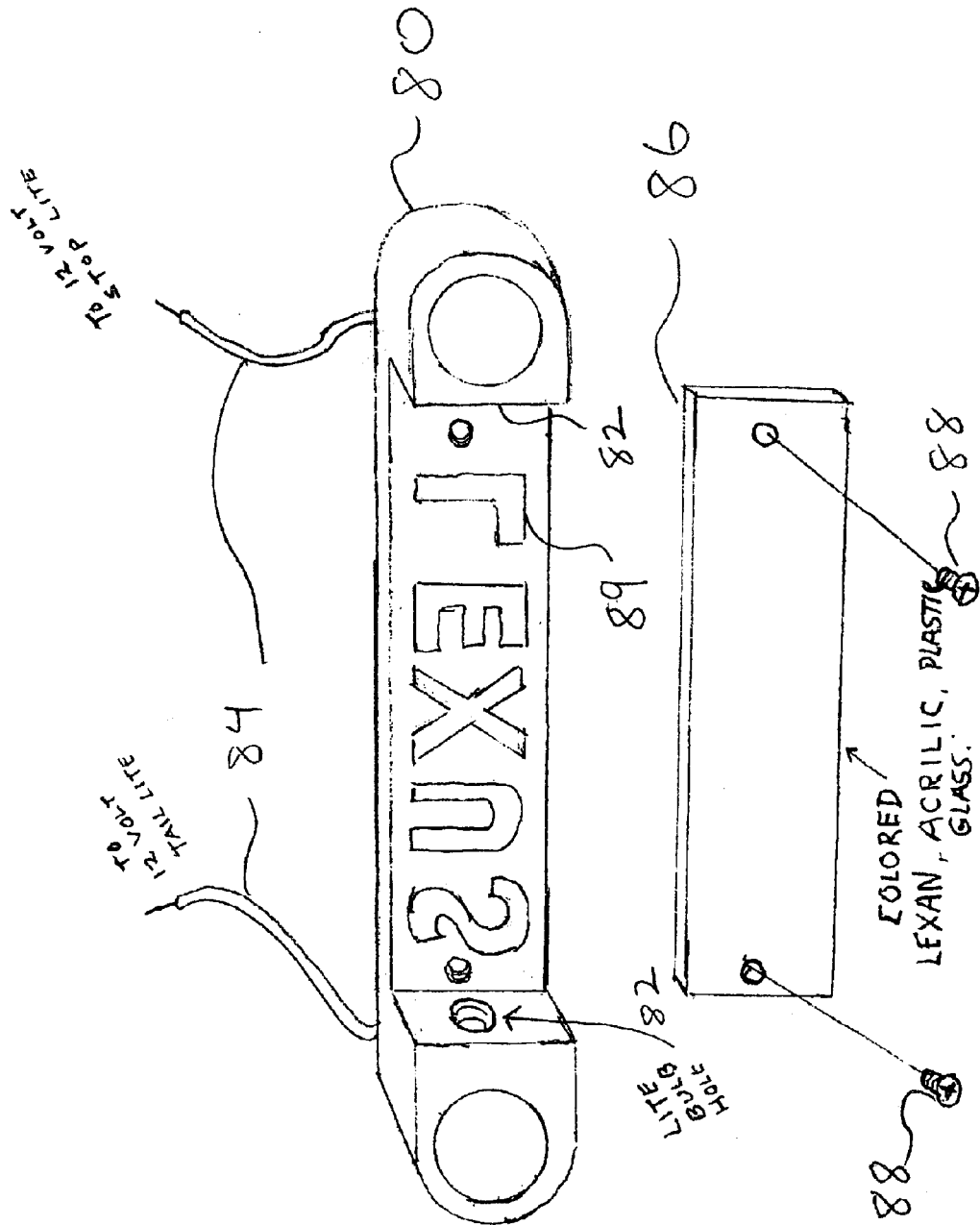
FIG. 5 shows a rear view of a perspective assembly drawing of an enhanced locking bar.
Figure 6:
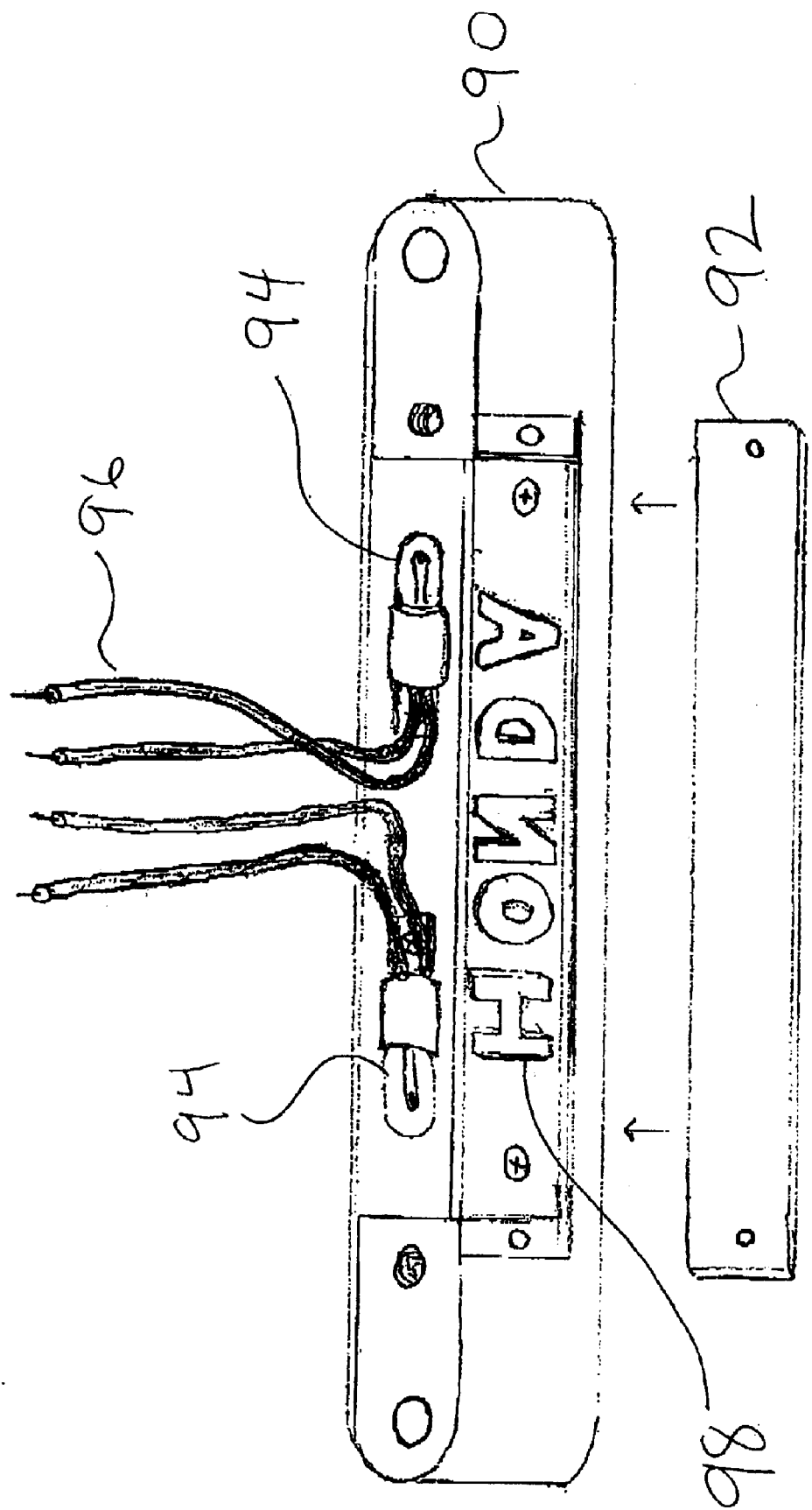
FIG. 6 shows a rear view of another embodiment of the locking bar.

FIG. 5 shows a perspective rear view assembly drawing of an enhanced locking bar 80, which may be used in place of the locking bar 30 of FIG. 1 or locking bar 60 of FIG. 2. Locking bar 80 includes light bulb holes 82 and electrical wires 84. A translucent plate 86, such as colored polycarbonate, acrylic, plastic or glass may be used to cover the assembly by attaching the plate 86 to the locking bar 80 with screws 88. When the lights alight, the colored translucent plate 86 allows colored light to propagate through the cut out emblem 89 for viewing from the opposite side. FIG. 6 shows a rear view of an embodiment of locking bar 90 with translucent plate 92, light bulbs 94, electrical wiring 96 and engraving 98.

Figure 7:
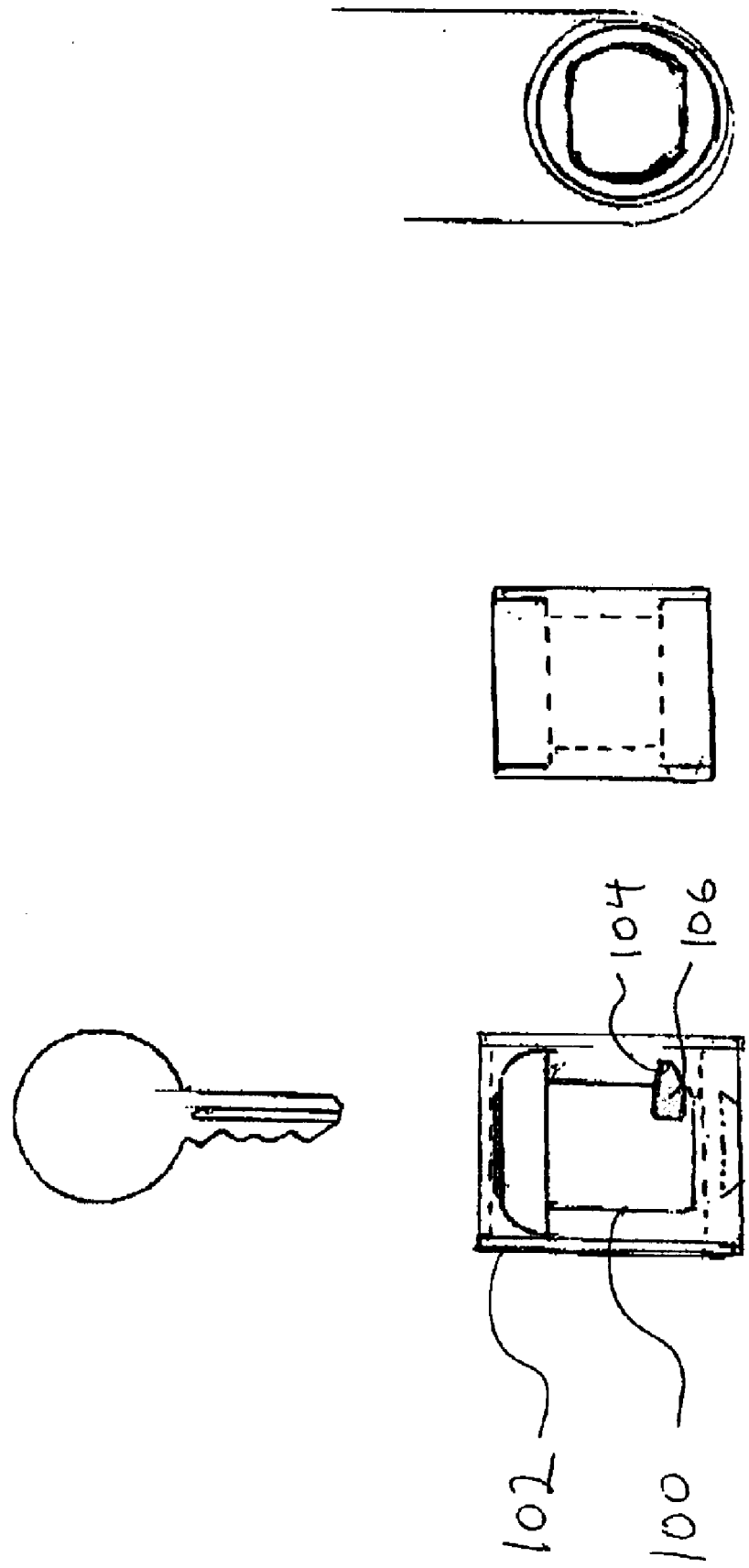
FIG. 7 shows a cylinder lock completely encased into the bar so that no part of the lock extends beyond the front of the bar.

FIG. 7 shows a cylinder lock 100 completely encased into the bored out segment of a locking bar 102, shown in a side view. Locking bar 102 is a replacement for the locking bars shown herein. The cylinder lock includes a locking extension comprising a tab 106. The bored out portion includes a cut-out or notch 104 for retaining the tab 106. In this embodiment, no part of the lock extends beyond the front of the bar.

FIG. 8 shows a spring-loaded dust cover for placement over the top of the cylinder lock. The cylinder lock 100 of FIG. 7 is shown with a line 108 indicating the position of its placement within the locking bar 102. The spring-loaded dust cover 110 is placed over the top of the cylinder lock 100 to prevent dust, moisture and other elements from coming in contact with the cylinder lock 100. A notched wall 103 is provided to enable removal of the cylinder lock 100.

FIG. 9 shows a hinge 120 attached to the edge of the license plate frame 122 for attachment to the vehicle to facilitate installation of the registration tags.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
    a license plate frame including at least one window covered with translucent material, wherein said at least one window is operatively positioned to cover a license plate registration tag, wherein said frame includes at least one through hole;
    a back bar having at least one threaded hole positioned to align with said at least one through hole;
    a locking bar having at least one bored out portion with a locking bar through hole configured for alignment with said at least one threaded hole and said at least one through hole, such that a screw may pass through the aligned holes to attach said locking bar, said frame and said back bar to a license plate mount; and
    at least one cylindrical lock for positioning within said at least one bored out portion, wherein said at least one cylindrical lock includes a locking extension, wherein said bored out portion includes means for receiving said locking extension, wherein said lock will cover said screw.

2. The apparatus of claim 1, wherein said locking extension comprises a removable lock pin.

3. The apparatus of claim 2, wherein said means for receiving said locking extension comprises a lateral through hole operatively placed so that said removable lock pin can pass through said lateral through hole and into said lock to prevent removal of said screw.

4. The apparatus of claim 1, wherein said at least one through hole comprises two through holes.

5. The apparatus of claim 1, wherein said at least one threaded hole comprises two threaded holes.

6. The apparatus of claim 1, wherein said at least one bored out portion comprises two bored out portions.

7. The apparatus of claim 1, wherein said at least one cylindrical lock comprises two cylindrical locks.

8. The apparatus of claim 1, wherein said at least one window comprises two windows.

9. The apparatus of claim 1, wherein said frame is reversible from top to bottom.

10. The apparatus of claim 1, wherein said frame comprises material selected from the group consisting of aluminum, plastic, metal and moldable materials.

11. The apparatus of claim 1, wherein said translucent material is selected fro the group consisting of plastic, glass, acrylic and polycarbonate.

12. The apparatus of claim 1, further comprising at least one light operatively connected to said frame light a portion or said lock bar.

13. The apparatus of claim 12, further comprising text engraved into said lock bar or said frame such that said at least one light will illuminate said text.

14. The apparatus of claim 1, wherein said locking extension comprises a tab.

15. The apparatus of claim 14, wherein said means for receiving said locking extension comprises a cut-out or notch operatively placed so that said tab can insert therein to prevent removal of said screw.

16. An apparatus, comprising:
    a frame including at least one window covered with translucent material, wherein said frame includes at least one hole;
    a back bar having at least one threaded hole positioned to align with said at least one through hole;
    a locking bar with a locking bar through hole configured for alignment with said at least one threaded hole and said at least one through hole, such that a means for attachment may pass through said locking bar through hole, said at least one through hole to attach said locking bar, said frame and said back bar to a mount; and
    at least one lock for positioning within said at least locking bar, wherein said at least one lock includes a locking extension, wherein said locking bar includes means for receiving said locking extension, wherein said lock will cover said means for attachment.

17. A method for preventing the theft of a license plate or a license plate registration tag, comprising:
    covering a license plate with a frame having at least one window covered with translucent material, wherein said at least one window is operatively positioned to cover a license plate registration tag, wherein said frame includes at least one through hole;
    placing a back bar behind said license plate, wherein said back bar has at least one threaded hole positioned to align with said at least one through hole;
    placing a locking bar on said frame, wherein said locking bar has at least one bored out portion with a locking bar through hole configured for alignment with said at least one threaded hole and said at least one through hole, such that a screw may pass through the aligned holes to attach said locking bar, said frame and said back bar to a license plate mount; and
    positioning and locking at least one cylindrical lock within said at least one bored out portion, wherein said at least one cylindrical lock includes a locking extension, wherein said bored out portion includes means for receiving said locking extension, wherein said lock will cover said screw.

18. The method of claim 17, wherein said locking extension comprises a removable lock pin, wherein said means for receiving said locking extension comprises a lateral through hole operatively placed so that said removable lock pin can pass through said lateral through hole and into said lock to prevent removal of said screw.

19. The method of claim 17, wherein said locking extension comprises a tab, wherein said means for receiving said locking extension comprises a cut-out or notch operatively placed so that said tab can insert therein to prevent removal of said screw.

20. The method of claim 17, wherein said at least one through hole comprises two through holes, wherein said at least one threaded hole comprises two threaded holes, wherein said at least one bored out portion comprises two bored out portions, wherein said at least one cylindrical lock comprises two cylindrical locks, wherein aid at least one window comprises two windows.

* * * * *